United States Patent [19]

Khanna et al.

[11] Patent Number: 5,403,896
[45] Date of Patent: Apr. 4, 1995

[54] BLOW MOLDING COMPOSITIONS OF POLYAMIDE AND CYANATE COMPONENTS

[75] Inventors: Yash P. Khanna; Rakesh Kumar, both of Morris; John P. Sibilia, Essex, all of N.J.

[73] Assignee: AlliedSignal Inc., Morris Township, Morris County, N.J.

[21] Appl. No.: 938,118

[22] Filed: Sep. 1, 1992

Related U.S. Application Data

[63] Continuation-in-part of Ser. No. 457,117, Dec. 26, 1989, abandoned.

[51] Int. Cl.⁶ .................... C08G 8/22; C08L 61/06; C08L 77/06
[52] U.S. Cl. .................... 525/420; 524/101; 525/429; 525/504
[58] Field of Search .................... 525/420, 429, 504; 524/101

[56] References Cited

U.S. PATENT DOCUMENTS

| | | | |
|---|---|---|---|
| 3,448,079 | 6/1969 | Grigat et al. | 525/504 |
| 4,022,755 | 5/1977 | Tanigaichi et al. | 525/504 |
| 4,197,379 | 4/1980 | Coran et al. | 525/142 |
| 4,831,086 | 5/1989 | Das et al. | 525/504 |
| 4,845,162 | 7/1989 | Schmitt et al. | 525/429 |
| 4,876,127 | 10/1989 | Khanna et al. | 428/35.7 |
| 4,978,727 | 12/1990 | Das et al. | 525/504 |

FOREIGN PATENT DOCUMENTS 8805443  7/1988  WIPO.

*Primary Examiner*—James J. Seidleck
*Assistant Examiner*—Thomas Hamilton, III
*Attorney, Agent, or Firm*—Michele G. Mangini; Melanie L. Brown; Roger H. Criss

[57] ABSTRACT

New process for blowing molding polyamide compositions, employing a composition comprising a polyamide and one or more cyanate components, specifically cross-linking cyanates which form a triazine upon curing.

20 Claims, 2 Drawing Sheets

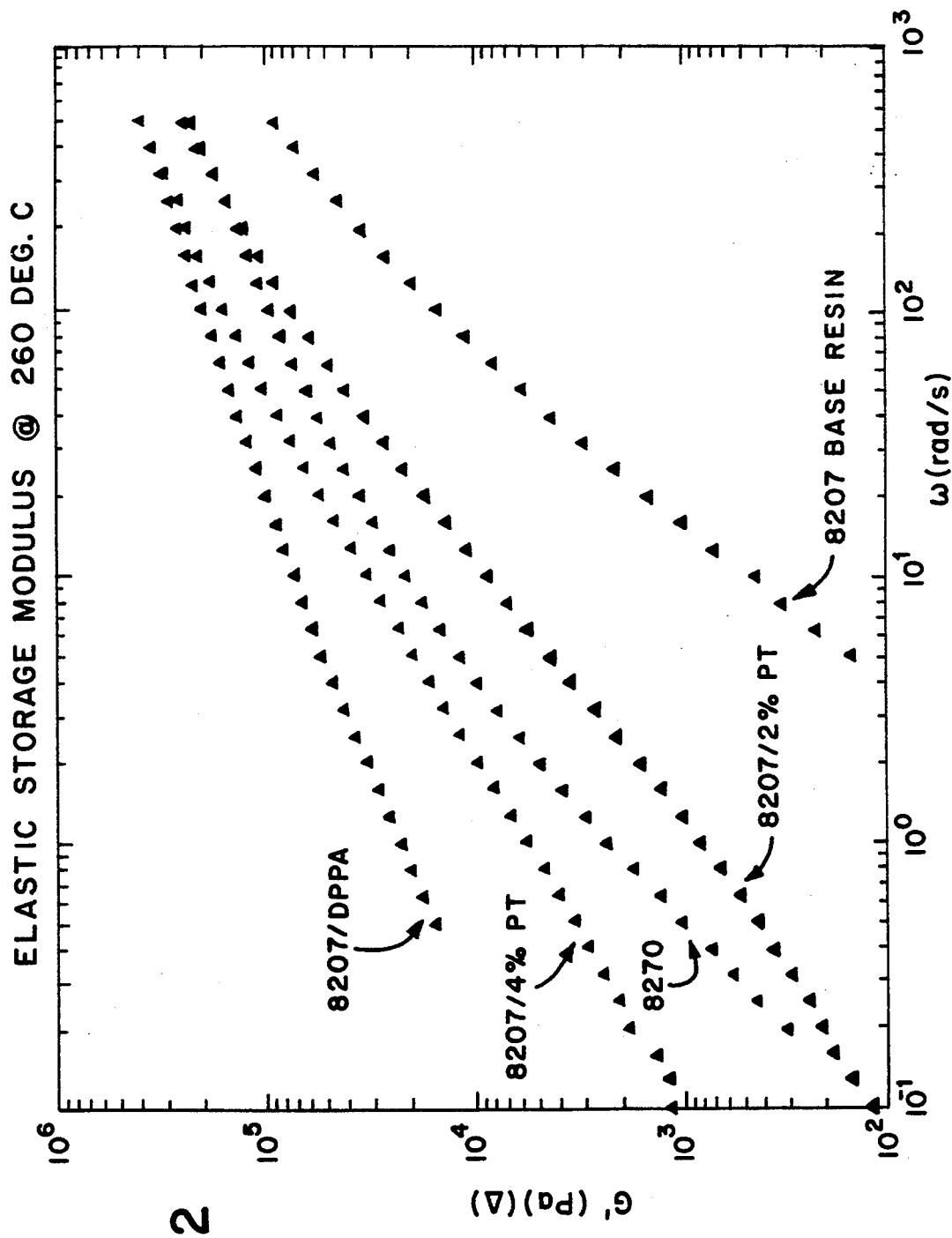

BLOW MOLDING COMPOSITIONS OF POLYAMIDE AND CYANATE COMPONENTS

RELATED APPLICATIONS

This application is a continuation-in-part application of U.S. patent application Ser. No. 457,117, filed on Dec. 26, 1989, now abandoned.

BACKGROUND OF THE INVENTION

1. Field of the Invention

This invention relates to a process for blow molding polyamide compositions. More particularly, this invention relates to a novel blow moldable composition which comprises a polyamide and an effective amount of one or more cyanate components.

2. Prior Art

While blow molded thermoplastics have been used for several years to manufacture automotive parts such as windshield washer fluid reservoirs, radiator overflow tanks, load floors, seat backs and shock absorber boots, the choice of resins has been limited mainly to high density polyethylene and polyester elastomers. Both have suitable processing ranges, but neither is noted for high-temperature resistance (both mechanical and chemical) or paintability. Nylon polymers, because of their inherent physical and chemical properties, can extend the range of product application for improved performance in high and low-temperature environments, and also can be painted.

However, the traditional array of nylon products has not included a true general-purpose blow molding resin. Although some have been used to a limited degree in the automotive industry and elsewhere, nylon resins in general have lacked broad applicability for blow molding because of the severely restricted processing latitude.

There are several properties which are necessary for blow molding resins. These resins should exhibit a high melt viscosity that is relatively independent of shear rate and a melt viscosity that has a relatively low dependence on processing temperature. Moreover, these resins should exhibit a large difference between processing temperature and freezing temperature (for crystalline resins) or a wide temperature range over which the resin will flow in the case of amorphous (non-crystalline) materials. Lastly, these resins should possess an optimum elastic compliance (melt elasticity) to provide the necessary melt strength for the parison to hang.

When the above criteria are applied to a typical nylon, the thermodynamic behavior of common nylon 66 homopolymer shows the resin lacking several of the characteristics important to blow molding. For example, in the case of nylon 66 homopolymer, the melting point is about 505° F. and the freezing point is 450° F. There are two significant opposing factors that result from this thermodynamic behavior. The relative proximity of freezing and melting temperatures dictates that the processing temperature be as high as possible above the freezing temperature. The greater this difference, the longer can be the parison drop time and hang time before portions of the parison cool to the freezing temperature. If any portion of the parison cools too close to the freezing temperature, that portion will be malformed or warped. On the other hand, increasing the processing temperature significantly above the melting temperature is self-defeating since nylon 66 is too fluid (lacks melt strength) at temperatures slightly above the melting temperature. The second factor is the temperature dependence of viscosity. This can be illustrated by an example.

If it is assumed that the surface cooling rate of a parison is about 2° F./sec (radiative loss only) and the temperature dependence of melt viscosity is 130 poise/° F., then the melt-viscosity change as the parison drops and just before blowing is at least 260 poise in the 2-sec time interval of the blow cycle. This viscosity change is so significant that the object will be thin in some areas where the viscosity is low and thick in others where the viscosity is high. But viscosity alone does not tell the complete story. Part of the problem is caused by the high absolute melt temperature of nylon 66, since radiative heat losses are a function of temperature to the fourth power.

Also, in those areas where the part is thicker, greater shrinkage will occur, which aggravates the problem of malformed articles. Both of these considerations make it very difficult to blow mold an unmodified nylon 66 homopolymer.

It could be argued that increasing the processing temperature to a value considerably above the freezing point would allow sufficient time before freezing and that would afford more uniform objects. However, in general, high melt viscosities are preferred for blow molding. Raising the temperature defeats this, and furthermore only increases the rate of radiative heat loss.

The situation is somewhat better with nylon 6 because of the greater disparity between melting and freezing points (437° F. and 361° F.) and the lower absolute melting and corresponding heat loss permit a longer time for parison drop. Additionally, the temperature dependence of the melt viscosity of nylon 6 is 40 poise/° F. about one-third the value of nylon 66. Not surprisingly, most commercial nylon blow molding applications are based on nylon 6 or copolymers thereof, where the lower absolute melting and freezing points (and differences), lower freezing rates, and temperature-dependent viscosity coefficients are advantageous.

Additionally, a resin with lower crystallinity is preferred for blow molding because the freezing rate is retarded significantly. One way of doing this is through the use of copolymers, for example, a (50.50) 6/66 nylon copolymer with a corresponding crystallinity of 40%. Reducing the crystallinity even further requires higher orders of copolymers or modification by agents that retard the crystallinity.

Increasing the molecular weight of the nylon will obviously retard parison sag. However, this alone does not reduce the tendency of the parison to be malformed because it does not affect significantly the crystallinity and, hence, freezing and melting behavior.

BRIEF SUMMARY OF THE INVENTION

The present invention is directed to a blow-moldable polyamide composition which contains an effective amount of at least one triazine.

Triazines are formed by cross-linking (often referred to as curing) a cyanate component (component as used herein includes any compound, monomer or polymer capable of crosslinking to form a triazine.

The invention also relates to a process of preparing a blow-moldable composition which comprises:

(a) adding an effective amount of (i) at least one cyanate component to at least one polyamide to form a composition;
(b) mixing (i) and (ii) to form a uniform mixture;
(c) drying the uniform mixture; and
(d) forming a molten mixture by heating said uniform mixture at a temperature above the melting point of said polyamide over time to cure the cyanate component.

Another embodiment of this invention relates to a process for blow molding which comprises:
(a) placing a molten mixture of at least one polyamide and an effective amount of at least one triazine into a mold having a predetermined configuration;
(b) introducing gas into said mold to form a hollow molten mixture having the configuration of said mold; and
(c) cooling said hollow molten mixture to form a hollow article having the configuration of said mold.

A further embodiment relates to molded articles formed by the above blow-molding process. The precured blow-moldable polyamide composition which contains an effective amount of triazine-forming cyanate component also forms a part of the present invention. The cyanate is cured or crosslinked by heating or reacting with a curing agent. While we do not wish to be bound by any theory, it is believed that the added cyanate component increases the melt viscosity and melt elasticity of the polyamide.

BRIEF DESCRIPTION OF THE DRAWINGS

FIG. 2 is a graph showing the melt elasticity of nylon 6, nylon 6 containing 2% and 4% cured phenolic cyanate resin and nylon 6 containing 1% diphenyl phosphoryl azide as a function of the shear rate.

DETAILED DESCRIPTION OF THE INVENTION

Figure 1:
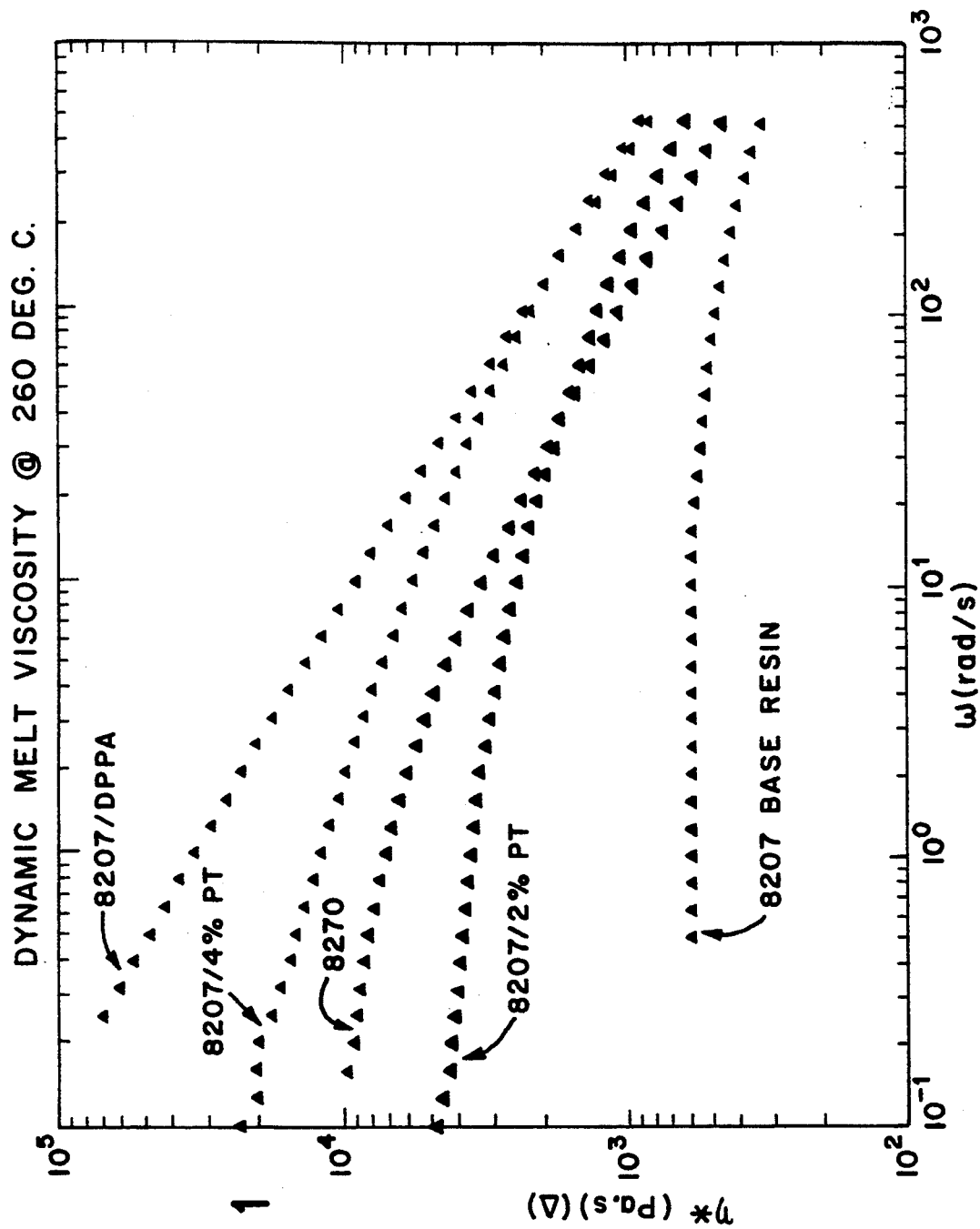
FIG. 1 is a graph showing the melt viscosity of nylon 6, nylon 6 containing 2% and 4% cured phenolic cyanate resin and nylon 6 containing 1% diphenyl phosphoryl azide as a function of the shear rate.

The blow moldable compositions of this invention are prepared from a precursor composition which comprises at least one polyamide and an effective amount of at least one cyanate component.

As used herein, "an effective amount" is an amount of cyanate which, when added to the polyamide in accordance with the invention, crosslinks or cures to form a triazine and renders the mixture blow-moldable. The mixture has a melt viscosity and melt elasticity which are greater than those of the polyamide as measured prior to such addition. It is noted that variables, such as polymer type, shear rate and temperature affect the melt viscosity. The increase in melt viscosity which is actually measured may vary correspondingly, however, an increase is obtained as long as variables affecting the viscosity measurement are maintained constant, and the same method for determining the melt viscosity is employed in performing the comparison tests. Similarly, variables affecting the measurement of melt elasticity should also be maintained constant and the same method is used for comparison tests.

The increase in melt-viscosity and melt-elasticity effected by the presence of an effective amount of cyanate in the polymer composition makes the mixture blow-moldable. Usually, the greater amount of cyanate used, the greater increase in melt viscosity and melt elasticity attained; and the converse is also valid, i.e. the less cyanate, the less the increase in melt viscosity and melt elasticity attained. However, the amount of cyanate used must be limited. The melt viscosity of the polyamide composition can be increased to a level at which the composition cannot be melt processed by conventional commercial techniques, and therein, the composition cannot be blow molded. Generally, the amount of cyanate is from about 0.05 to less than about 20 weight percent based on the total weight of the mixture. In preferred embodiments of this invention, the quantity of cyanate employed ranges from about 0.05 to less than about 15 weight percent based on the total weight of the mixture. In a more preferred embodiments of this invention, the weight percent of is in the range of from about 0.1 to less than about 10 weight percent. In a particularly preferred embodiment, the quantity of cyanate is from about 0.1 to about 8 weight percent of the total mixture. In the further preferred embodiment, the quantity of cyanate is from about 1 to 5 weight percent, with from 2 to 4 weight percent being the quantity of choice.

The blow-moldable composition itself comprises at least one polyamide and an "effective" amount of at least one triazine. The "effective" amount when discussed in conjunction with the "effective" amount of triazine is the amount of triazine or crosslinked cyanate sufficient to increase the melt viscosity and melt elasticity of a polyamide to allow blow-molding of said polyamide in conventional blow-molding apparatus. The crosslinking or curing of the cyanate occurs by "cyclotrimerization" or polycyclotrimerization" through cyanate groups. For example, a dicyanate component of the formula NCO—R—OCN (wherein R is a divalent aliphatic or aromatic containing group) undergoes cyclotrimerization by the polymeric condensation of three cyanate groups to form a crosslinked (cured) aromatic system which has the following repeating unit:

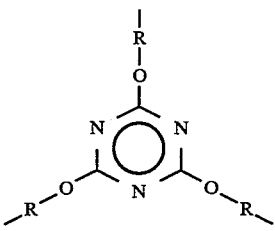

Any cyanate component capable of crosslinking to form a triazine can be used in the practice of the invention. Preferably, polycyanate components are used to assure continued crosslinking cyanate, once the initial triazine is formed.

The cyanate component employed in the practice of this invention may include cyanates having the formula NCO—R—OCN and polymeric forms thereof. The R group is a divalent organic radical which is an aliphatic group or aromatic containing group.

Illustrative aliphatic groups include substituted and unsubstituted alkylenes and cycloalkylenes having from 1 to about 20 carbons, such as ethylene, ethyl ethylene, isopropylmethylne, ethylene, propylene, butylene, isobutylene, pentylene, hexylene, cyclohexylene, cyclooctylene, cyclohexane dimethylene, furfuryl ethylene and the like.

The aromatic containing groups may have aromatic linkage to the —OCN groups or non-aromatic linkage. Illustrative of non-aromatic containing linking groups include 1,3-benzenedimethylene, 1,4-benzenedimethylene, 4methoxyphenylmethylene and cycloalkylenes, such as cyclohexylene, cycloctylene, 1,3-cyclohexanedimethylene and the like.

Cyanates containing an aromatic linking group are preferred. These cyanates have one of the following formulas:

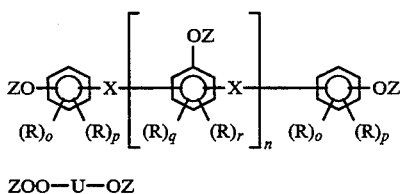

$$ZOO-U-OZ \qquad II$$

wherein:
q and r are the same or different and are whole numbers from 0 to 3 with the proviso that the sum of q and r at each occurrence is equal to 3;

Z is hydrogen or —CON;

o and p are the same or different at each occurrence and are positive whole numbers from 0 to 4, with the proviso that the sum of o and p is equal to 4;

X is a diva lent radical;

$R_1$ is the same or different at each occurrence and is a radical or hydrogen which is unreactive under conditions necessary to crosslink the cyanate moieties;

n is a positive whole number including zero; and U is an unsubstituted or substituted aromatic radical having a monocyclic or polycyclic structure.

With respect to Formula I, in particularly preferred embodiments, X is —O—, —S—, —O(O)C—, —(O)CO—, —S—, —SO—, —SO$_2$— or an unsubstituted or substituted alkylene having from 1 to about 20 carbons. In additional preferred embodiments, R is hydrogen or alkyd having from 1 to about 20 carbons.

The more particularly preferred aromatic cyanates of Formula I are those in which each phenolic ring contains two methyl substituent groups and one cyanato group. Most preferably, the aromatic cyanate selected is capable of forming a phenolic triazine resin having a thermal stability of at least about 400° C., preferably about 450° C., as measured by thermogravimetric analysis.

Additional preferred aromatic cyanates for use in the practice of the invention include dicyanato bisphenols. Illustrative of such compounds are bis(phenol-4-cyanate) dimethylmethylene (which is bisphenol-A dicyanate), bis(3,5-dimethylphenyl-4-cyanate) and 4,4'-thiobisphenol cyanate, all of which are known. Phenol cyanates of Formula II, such as resorcinol dicyanates, are also useful in the practice of the invention.

Many of the cyanates for use in the invention are commercially available or are well known in the art and; correspondingly, the processes for making them.

Preferred aromatic cyanates can be formed in accordance with the following steps. First, react a phenolic resin, preferably a novalac resin, and a base, preferably triethylamine in a cyclic ether solvent to form a trialkylammonium salt of novolac. Second, react the trialkylammonium salt with cyanogen halides in cyclic ether to form a phenolic cyanate resin. The temperature for the above reaction should be below 5° C.

Phenolic triazines prepared from phenolic cyanate resins are described in PUT Internal Application WO 88/05443 (pub. no), published Jul. 28, 1988, and U.S. Pat. No. 4,831,086 to Dan Ed a., which are incorporated herein be reference. The phenolic triazine resins disclosed in the above-references are very useful in the practice of this invention since these materials have outstanding thermal and oxidative stability.

U.S. Pat. Nos. 3,448,079 to Grigat and 4,022,755 to Tanigaichi which are also incorporated herein by reference, disclose additional methods for preparing phenolic cyanate resins.

Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

$$NHCORCONHR^1$$

in which R is an alkylene group of at least 2 carbon atoms, preferably from about 2 to about 10 or arylene having at least about 6 carbon atoms, preferably about 6 to about 16 carbon atoms; and $R_1$ is selected from R and phenol groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), Polk(decamethylene sebacamide) (nylon 10,10), poly[his(4-amino cyclohexyl)methane-1,10-decanecarboxamide)] (Guiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide).

The blow moldable composition is prepared in accordance with the following steps:

(a) mixing an effective amount of (i) at least one cyanate component and (ii) at least one polyamide to form a uniform mixture;
(b) drying the uniform mixture;
(c) forming a molten mixture by heating said uniform mixture overtime at a temperature above the melting point of the polyamide and sufficient to cure the cyanate component; and
(d) drying the molded mixture. As used herein, a "molten mixture": is a mixture of polyamide and a cyanate component which has been heated to a temperature which is equal to or greater than the melting point of the polyamide component of the mixture and/or equal to or greater than the crosslinking temperature of the cyanate. The manner in which the molten mixture is formed is not critical and conventional methods can be employed. For example, the molten mixture can be prepared through use of conventional polyamide is heated to a temperature equal to or greater than its melting point. An effective amount of cyanate resin in a granulated, powdered or liquid form either neat or diluted with a diluent is then added to the melted polyamide while vigorously stirring the melt. Heating is continued until cross-linking of the cyanate occurs to reach the required increase in melt index and increase in viscosity has been obtained.

Alternatively, the components for a blow-moldable composition can be granulated and the granulated components mixed dry or either in neat form or diluted with a diluent, in a suitable mixer, as for example, a Bran bury Mixer, a tumbler or the like, as uniformly as possible and thereafter dried in a vacuum. Thereafter, the composition is heated in an extrude until the polyamide is melted. As described above, the mixture is heated until the desired increase in the melt elasticity and viscosity has been obtained, and such properties are expressed even after cooling the composition.

The order of mixing the various components is not critical. Accordingly, the order of addition of the polyamide and cyanate component, or other optional components, to be described in more detail hereinbelow to form the mixture, can be varied as desired.

Various optional ingredients, which are normally included in polyamide compositions, may be added to the mixture at an appropriate time during the conduct of the process. These optional ingredients can be added either prior to or after crosslinking the cyanate component. Preferably, optional ingredients are added prior to forming the crosslinked triazine. Such optional components include filers, plasticizers, impact modifiers, colorants, mold release agents, anti oxidants, ultraviolet light stabilizers, lubricants, antistatic agents, fire retardants, and the like. These optional components are well known to those of skill in the art, accordingly, only the preferred optional components will be described herein in detail.

Preferably, the blow-moldable composition of this invention includes a particular filler, which functions to increase the modulus and stiffness of the composition, and provides a more economical composition. Any conventional filler can be employed provided that is provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials metal salts, and material thereof. Examples of such useful fillers include alumina, aluminum hydrates, feldspars, asbestos, talc, calcium carbonates, clay, carbon black, glass quartz, novaculite and other forms of silica, kaolinite, bentonite, garnet, mica, saponite, beidellite, calcium oxide, calcium hydroxide, etc., such fillers are well known material and are readily available. The foregoing recited fillers are illustrative only and are not meant to limit the scope of the fillers that can be employed in this invention. In the preferred embodiments of this invention, fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polyamide component, and in the particularly preferred embodiment is in the range of from about 30 to about 90 weight percent of the same basis.

It is also very desirable to include a plasticizer of the type known in the art for us with polyamide composition. Useful plasticizers include caprolactam, mixtures of ortho- and para-toluene ethyl sulfonamides, and the like.

The molten mixture of polyamide and triazine can be blow molded using conventional techniques.

Generally, the process for blow molding comprises:
(a) placing a molten mixture of at least one polyamide and an effective amount of at least one triazine into a mold having a predetermined configuration;
(b) introducing a gas into said mold to form a hollow molten mixture having the configuration of said mold; and
(c) cooling said hollow molten mixture to form a hollow article having the configuration of said mold.

Conventional blow molding procedures, such as extrusion blow molding, injection blow molding and the like can be used. After forming the blow-molded article, any excess flesh is trimmed from the article and reclaimed for further use.

This invention provides polyamide compositions having increased melt viscosity and increased melt elasticity as compared to polyamide compositions which do not include a triazine component. Because of the increases in melt elasticity and melt viscosity, the polyamide compositions are especially useful in blow-molding molded parts, bottles and similar articles.

In order that this invention may be better understood, the following examples are set forth. These examples are for purposes of illustration only and are not to be construed as limiting the scope of the invention in any manner.

EXAMPLE I (A) Preparation of Phenolic Cyanate Resin

A mixture of 1377 g of novolac (760 number average molecular weight by (VPO) 1434 g triethylamine was dissolved in 7 L of tetrahydrofuran at ambient temperature. A 1623 g of cyanogen bromide was dissolved in AL of tetrahydrofuran under a nitrogen atmosphere. The solution containing the trialkylammonium salt of novolac was added to the cyanogen bromide solution over a period of two hours, with an average addition rate of 50–60 ml/mix. During the addition, the temperature reaction mixture was maintained at $-40°$ to $-50°$ C. After the mixture was completed, the mixture was allowed to stand for one hour. The product was isolated by filtration through silica gel to remove the trialkyammonium salt. The filtrate was purified by precipitation in an isopropanol/dry ice mixture ($-15°$ C. to $-20°$ C.) twice and subsequently dried in a vacuum oven overnight to produce solid off-white cyanated phenolic resin. The elemental analysis indicated (calculated) % C=72.25, (72.73) % H=4.2 (4.54) and % N 10.42 (10.60). The IR spectrum indicated strong absorption at 2230 CM (C N). GC analysis showed diethylcyanamide content is 0.005 wt %. Gel time at 200° C. was determined to be 12 minutes.

(B) Composition Preparation

Commercial grade nylon 6 (8207F from Allied-Signal Inc.) of molecular weight 35–40,000 was freeze-ground to an average particle size of less than 2 mm in a conventional grinding mill and subsequently vacuum dried at 95° C. The polymer was then mixed with 2% phenolic cyanate resin and 4% phenolic cyanate resin (w/w). In order to ensure uniform mixing of the phenolic resin throughout the polyamide, phenolic cyanate resin powder was dissolved in acetone and the solutions added to the nylon 6. The coated granular resin was then dried at about 40° C. and subsequently molded at 260° C. for 15 minutes. Under these molding conditions, the phenolic resin undergoes curing to phenolic triazine.

The mold samples obtained above were dried under vacuum. The dry molded samples were chopped into small pieces and found to be successfully extruded through a capillary rheometer at 270° C. for melt-processing.

COMPARISON EXAMPLE I (A) Composition Preparation

Commercial grade nylon 6 of molecular weight of 35–40,000 from Allied-Signal Inc. was freeze ground to an average particle size less than 2 mm in a conventional grinding mill and subsequently vacuum dried at 95° C. The polymer was then coated with 1% diphenylphosphorylazide (DPPA) by weight based on the weight of the polymer. A solution coating process was chosen to ensure uniformity in the dispersion of the DPPA. The coated granular resin was then dried, extruded and pelletized. The extrusion was carried out on a one inch single screw extruder, with fluted mixing sections and a die zone temperature of 280° C. The extruded strand was quenched in a water bath, containing water/ice mixture and subsequently pelletized. The pellets obtained is the modified nylon resin used for the extrusion blow molding operation.

(B) Blow Molding Procedure

The extrusion blow molding process line used contained a plasticating extruder to melt and pump the resin, an annular exit die fitted to the extrude to form the parison, auxiliary equipment to cut and position the parison in the mold and the mold itself whose inner wall forms the shape of the desired object. The screw used for the extrude was a single flight Ed 80 mm diameter and equipped with mixing pins. The modified nylon was extruded through the annular die with the exit melt temperature at 272° C. The parison formed was then cut and enclosed in the mold whose walls were maintained at 7° C. by a circulating coolant. Final shaping of the parison in the mold is achieved by pinching the bottom of the parison and blowing air into the mold until the parison takes the shape of the inner wall. The mold is then opened and the bottle ejected. Processing of nylon 6 control resin which does not contain DPPA under similar conditions; however, does not yield the bottle.

Further information regarding the blow molding of a DPPA/polyamide composition is discussed in U.S. patent application Ser. No. 269,030 filed Nov. 9, 1988, now U.S. Pat. No. 4,876,127, which is incorporated herein by reference.

(B) Rheological Properties

A series of experiments were carried out on the samples prepared from Example I and comparison Example I to show the effect of phenolic based resins derived from cyanato containing phenolic resins on the melt viscosity and melt elasticity of polyamide. (See Table 1.)

The melting temperature, melt elasticity and melt viscosity of the various samples were determined. The melting temperature of the various samples were determined by differential scanning calorimetry (DSC). In these experiments, a DuPont 9900 Thermal Analyzer with a DSC cell in argon atmosphere was used. A sample was crimped in an aluminum pan and heated at 10° C./min. After initial heat-up, the sample was held at 280° C. for 5 min. prior to programmed cooling (10° C./min.). A subsequent reheat was carried out under the same conditions as the initial heat-up.

The melt viscosity and melt elasticity measurements were made using a Rheometric Dynamic Spectrometer. In these experiments, samples for rheological measurements were dried under vacuum generally pressure lower than 0.05 mm:Hug at 95° C. for a period of 15 hrs. and stored in a dry atmosphere. A Rheometric Dynamic Spectrometer was used to measure properties of the nylon melt at 260° C., namely the storage modulus (G') and the complex viscosity (n*). Measurements were made in a parallel plate geometry using the 25 mm diameter plates over a frequency (i.e. deformation rate, analogous to shear rate) range of 1–500 radians/second.

The results of these experiments are set forth in Table I and FIGS. 1 and 2. In Table I, Sample A is nylon 6 pellets obtained from Allied-Signal Inc. under the trade designation 8207F; Sample B is nylon 6 (8207F) which has been grafted with 1.5 percent by weight of the styrene maleic anhydride (SMA); Sample C is nylon 6 containing 1% by weight of diphenyl phosphoryl azide; Sample D is nylon 6 (8207F) containing 2% by weight of crosslinked phenolic cyanate (phenol triazine) resin and Sample E is nylon 6 (8207F) containing 4% by weight of crosslinked phenolic cyanate resin (phenol triazine).

Sample D [nylon 6 (98%)/PT resin (2%)] and Sample E [nylon 6 (96%)/PT resin (4%)] shown in Table I and FIGS. 1 and 2 demonstrate that the compositions of the invention have thermorheological parameters, i.e. blow molding characteristics, in the range of blow molding resins and compositions. It should be noted that the unmodified polyamide such as Sample A does not blow mold while Samples B and C have been known to blow mold.

It is noted that the phenolic resin in the polyamide composition is not acting or functioning simply as an inert filler. Based on Einstein's equation $N_f/N_o = 1 + 2.5\phi$ (where $n_f$=viscosity of filled polymer, $n_o$=viscosity of unfilled polymer and $\phi$=volume fraction of filler) and given 4% by weight phenolic resin containing polyamide, the increase in viscosity would have been 10%. The observed increase for the phenolic resin containing polyamide is 2400%. It is clearly implied that the phenolic resin modifies nylon 6 through molecular interaction. Table I depicts the thermo-rheological characterization of nylon 6 based resins.

TABLE I
THERMO-RHEOLOGICAL CHARACTERIZATION OF NYLON 6 BASED RESINS

| Sample | | $T_m - T_{cc} = T$, °C. |
|---|---|---|
| Sample A | Nylon 6 control (8207F) | 222 − 184 = 38 |
| Sample B | Nylon 6 (8270)-Grafted with 1.5% SMA* | 220 − 178 = 42 |
| Sample C | Nylon 6 + 1% DPPA** | 217 − 178 = 39 |
| Sample D Example 1 | Nylon 6 + 2% PT+ resin | 221 − 179 = 42 |
| Sample E Example 2 | Nylon 6 + 4% PT resin | 220 − 176 = 44 |

| | Melt Viscosity N* (Pa-S) @ 0.5 rad/sec | Melt Elasticity G' (Pa) @ 5 rad/sec |
|---|---|---|
| Sample A | 592 | 138 |
| Sample B | 8,070 | 11,330 |
| Sample C | 44,640 | 49,590 |
| Sample D Example 1 | 3,920 | 4,166 |
| Sample E Example 2 | 14,820 | 18,770 |

*SMA is styrene maleic anhydride
**DPPA is diphenyl phosphoryl azide
+PT is crosslinked phenolic cyanate resin or phenolic triazine (the amount measured is the amount of the cyanate resin added prior to curing).

EXAMPLE II

In accordance with the procedure in Comparative Example 1, blends of 80% nylon 6+20% PT resin-were made. We then studied the processibility of such blends using the rheometer. The melt viscosity increased to the point that the forces required to make the resin flow at shear rates greater than 10 sec$^{-1}$ were beyond the capability of the rheometer. It is noted that shear rates of at least about 100 sec$^{-1}$ and greater are involved during melt processing. Using the rheometer, we could make the blend flow only at shear rates less than 10 sec$^{-1}$. It is noted that the melt viscosity increased to the point that due to excessive power requirements, the instrument blew a fuse repeatedly with each processing attempt. It is known that a capillary rheometer, such as the one used, predicts the processibility of a resin. Therefore, we conclude that the above polymer composition cannot be melt processed as needed for blow molding.

What is claimed is:

1. A blow-moldable composition comprising:
   (a) at least one polyamide resin; and
   (b) at least one cyanate component; wherein the cyanate component ranges from about 0.05 to less than about 15 weight percent based upon the total weight of the composition.

2. The composition of claim 1 wherein the said composition is cured.

3. The polyamide of claim 1 wherein the polyamide is nylon 6,6 (polyhexamethylene adipamide)or nylon 6 (polycaprolactam).

4. The composition of claim 2 wherein the cyanate component is a cyanate group containing monomer or polymer.

5. The composition of claim 4 wherein the composition comprises a mixture of cyanate components.

6. The composition of claim 4 wherein the cyanate monomer or polymer has one of the following formulas

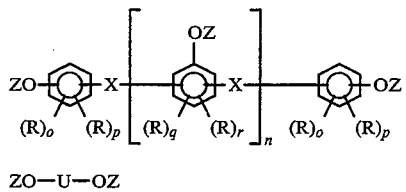

ZO—U—OZ wherein:
q and r are the same or different and are whole numbers from 0 to 3 with the proviso that the sum of q and r at each occurrence is equal to 3;

Z is hydrogen or —CN;

o and p are the same or different at each occurrence and are positive whole numbers from 0 to 4, with the proviso that the sum of o and p is equal to 4;

X is a divalent radical

R is the same or different at each occurrence and is a hydrocarbon radical or hydrogen which is unreactive under conditions necessary to crosslink the cyanurate moieties;

n is a positive whole number including zero; and

U is an unsubstituted or substituted aromatic radical having monocyclic or polycyclic structure.

7. The composition of claim 6 wherein X is —O—, —S—, —SO$_2$—, —C—, —O(O)C—, —(O)CO—, —S—S—, —SO—, or unsubstituted or substituted alkylene having 1 to 20 carbons.

8. The composition of claim 6 wherein R is hydrogen or a lower alkyl having from 1 to about 6 carbons.

9. The composition of claim 6 wherein the cyanate cross-links to form triazine resin having a thermal stability of at least about 400° C. as measured by thermogravimetric analysis.

10. The composition of claim 6 wherein the cyanate monomer is selected from the group consisting of bis(-phenol 4-cyanate) dimethylene, bis(3,5-dimethylphenyl-4-cyanate) and 4,4'-thiobisphenolcyanate.

11. The composition of claim 6 wherein said monomer is resorcinol dicyanate.

12. The composition of claim 1 wherein the composition is a mixture.

13. The composition of claim 1 wherein the composition is a blend.

14. The composition of claim 1 wherein said cyanate component is a phenolic resin which is coated on to the polyamide.

15. A process for preparing the composition of claim 1 wherein components (a) and (b) are melt blended.

16. A process for preparing the composition of claim 1 wherein components (a) and (b) are solution blended.

17. A process for preparing the composition of claim 1 wherein (a) and (b) are physically mixed.

18. The composition of claim 1 wherein the composition contains from about 0.05 weight percent to less than about 10 weight percent of cyanate component.

19. The composition of claim 1 wherein the cyanate component is a phenolic cyanate resin.

20. The composition of claim 19 wherein the composition contains from about 0.1 to about 8 weight percent of phenolic cyanate component.

* * * * *